United States Patent Office 3,121,746
Patented Feb. 18, 1964

3,121,746
PROPYNYL α-NAPHTHYLAMINES
Chester E. Pawloski, Bay City, Mich., assignor to The Dow Chemical Company, Midland, Mich., a corporation of Delaware
No Drawing. Filed Mar. 23, 1961, Ser. No. 97,745
3 Claims. (Cl. 260—577)

This invention is directed to propynyl α-naphthylamines corresponding to the formula

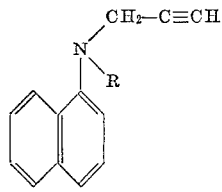

wherein R represents hydrogen or (2-propynyl). These compounds are liquid materials somewhat soluble in many common organic solvents and of very low solubility in water. They are useful as parasiticides and herbicides for the control of the growth and the killing of a number of plant, insect, bacterial and fungal organisms such as mites, ticks, round worms, German millet, pigweed and Sudan grass.

The new propynyl α-naphthylamines are prepared by reacting propargyl bromide or propargyl chloride with α-naphthylamine. The reaction is carried out in a liquid reaction medium such as diethyl ether, acetone, benzene or heptane and in the presence of a halide acceptor which may be an excess of the amine reagent and conveniently a basic material such as an alkali metal carbonate. The reaction takes place smoothly at the temperature range of from about 34°–100° C. with the production of the desired product and halide of reaction. This halide appears in the reaction mixture as the salt of the amine reagent or of the metal in the employed base. Good results are obtained when reacting about one molecular proportion of α-naphthylamine with about one molecular proportion of propargyl halide in the presence of about one molecular proportion of the halide acceptor. Where optimum yields of N-(2-propynyl) α-naphthylamine are desired, it is preferred to employ substantially equimolecular proportions of the reactants. For optimum yields of N,N-di(2-propynyl) α-naphthylamine at least two molecular proportions of propargyl halide are employed with one molecular proportion of α-naphthylamine. In such preferred operations, the hydrogen halide acceptor is employed in an amount substantially equimolecular with the employed amount of propargyl halide. Upon completion of the reaction, the desired product may be separated and purified by conventional procedures.

In carrying out the reaction, the propargyl halide, α-naphthylamine and halide acceptor are mixed and contacted in the reaction medium and the resulting mixture maintained for a period of time with stirring at a temperature of from about 34° to 100° C. to insure completion of the reaction. The reaction mixture conveniently is then washed with water and the washed mixture fractionally distilled under reduced pressure to obtain the desired product as a liquid material.

The following examples merely illustrate the invention and are not to be construed as limiting.

EXAMPLE I

N-(2-Propynyl) α-Naphthylamine

α-naphthylamine (143 grams; one mole), and 140 grams (one mole) of potassium carbonate were dispersed in 300 milliliters of acetone and the mixture brought to the boiling temperature. 121 grams (one mole) of propargyl bromide was added portionwise to the above warmed mixture with stirring and over a period of two hours. Stirring was thereafter continued and the reaction mixture maintained at the boiling temperature and under reflux for 14 hours. The mixture was thereafter washed with water and the washed mixture fractionally distilled under reduced pressure to obtain an N-(2-propynyl) α-naphthylamine product as a liquid material boiling at 130° C. at 0.5 millimeter pressure and having a refractive index n/D of 1.6520 at 25° C.

EXAMPLE II

N,N-Di(2-Propynyl) α-Naphthylamine

α-naphthylamine (one mole), propargyl bromide (two moles) and potassium carbonate (two moles) were dispersed in 750 milliliters of acetone and the resulting mixture heated with stirring at the boiling temperature and under reflux for 24 hours. The reaction mixture was then washed with water and the washed mixture fractionally distilled under reduced pressure to obtain an N,N-di(2-propynyl) α-naphthylamine product as a liquid material boiling at 150° C. at 1.7 millimeters pressure and having refractive index n/D of 1.6287 at 25° C.

The novel products of the present invention are useful as herbicides and parasiticides for the control of the growth and killing of a number of plant and parasite species. For such uses, the products are dispersed on an inert finely divided solid and employed as a dust. Such mixtures also may be dispersed in water with or without the aid of a surface active agent, and the resulting aqueous suspensions employed as sprays. In other procedures, the products are employed as an active constituent in solvent solutions, oil-in-water or water-in-oil emulsions, or aqueous dispersions. In representative operations, N,N-di(2-propynyl) α-naphthylamine gives 100 percent controls of the growth of the germinant seeds and emerging seedlings of German millet at a dosage of 50 pounds per acre. In other operations, N-(2-propynyl) naphthylamine gives a 100 percent control of the growth of *Bacillus subtilis* and *Aspergillus terreus* at a concentration of 500 parts per million by weight.

I claim:
1. A compound selected from the group consisting of N-(2-propynyl) α-naphthylamine and N,N-di(2-propynyl) α-naphthylamine.
2. N-(2-propynyl) α-naphthylamine.
3. N,N-di(2-propynyl) α-naphthylamine.

References Cited in the file of this patent
UNITED STATES PATENTS
2,342,493    Reppe et al. _____ Feb. 22, 1944

OTHER REFERENCES

Wolf: Justus Liebig's Annalen der Chemie (1952), Band 576, page 36.

Conant et al.: Chemistry of Organic Compounds, 4th ed., 1952, p. 549.